United States Patent
Davies

(10) Patent No.: US 6,289,946 B1
(45) Date of Patent: Sep. 18, 2001

(54) FUEL FILLING POINT

(75) Inventor: Anthony Davies, Carmarthenshire (GB)

(73) Assignee: Avon Inflatables Limited, Carmarthenshire (GB)

( * ) Notice: Subject to any disclaimer, the term of this patent is extended or adjusted under 35 U.S.C. 154(b) by 0 days.

(21) Appl. No.: 09/567,888

(22) Filed: May 10, 2000

(30) Foreign Application Priority Data

May 10, 1999 (GB) .................................... 9910827

(51) Int. Cl.⁷ .................. B65B 1/04; B65B 3/04; B67C 3/02
(52) U.S. Cl. .............. 141/86; 141/88; 141/390; 137/312; 137/314
(58) Field of Search .................. 141/86–88, 286, 141/311 A, 390–392; 222/108–111, 571; 184/106; 137/312–314

(56) References Cited

U.S. PATENT DOCUMENTS

| | | |
|---|---|---|
| 5,571,249 * | 11/1996 | Boylen .................................. 141/86 |
| 5,662,149 | 9/1997 | Armellino . |
| 5,762,114 * | 6/1998 | Petersen .................................. 141/86 |
| 5,850,858 * | 12/1998 | Zeigler .................................. 141/86 |

FOREIGN PATENT DOCUMENTS

| | | |
|---|---|---|
| 0761487A2 | 3/1997 | (EP) . |
| 2 467 820 | 4/1981 | (FR) . |
| 2030941 A | 9/1979 | (GB) . |
| 2240096 | 1/1990 | (GB) . |

* cited by examiner

Primary Examiner—Timothy L. Maust
(74) Attorney, Agent, or Firm—Jones, Tullar & Cooper, PC

(57) ABSTRACT

A fuel filling point arrangement is provided which is particularly suitable for marine vessels. The arrangement has a fuelling aperture connected via a fuelling conduit to a fuel tank of a marine craft, with an overflow pocket provided below the aperture so as to collect fuel overflow. A draining aperture is provided at the bottom of the overflow pocket for draining accumulated fuel to the outside of the craft or to an overflow tank.

10 Claims, 2 Drawing Sheets

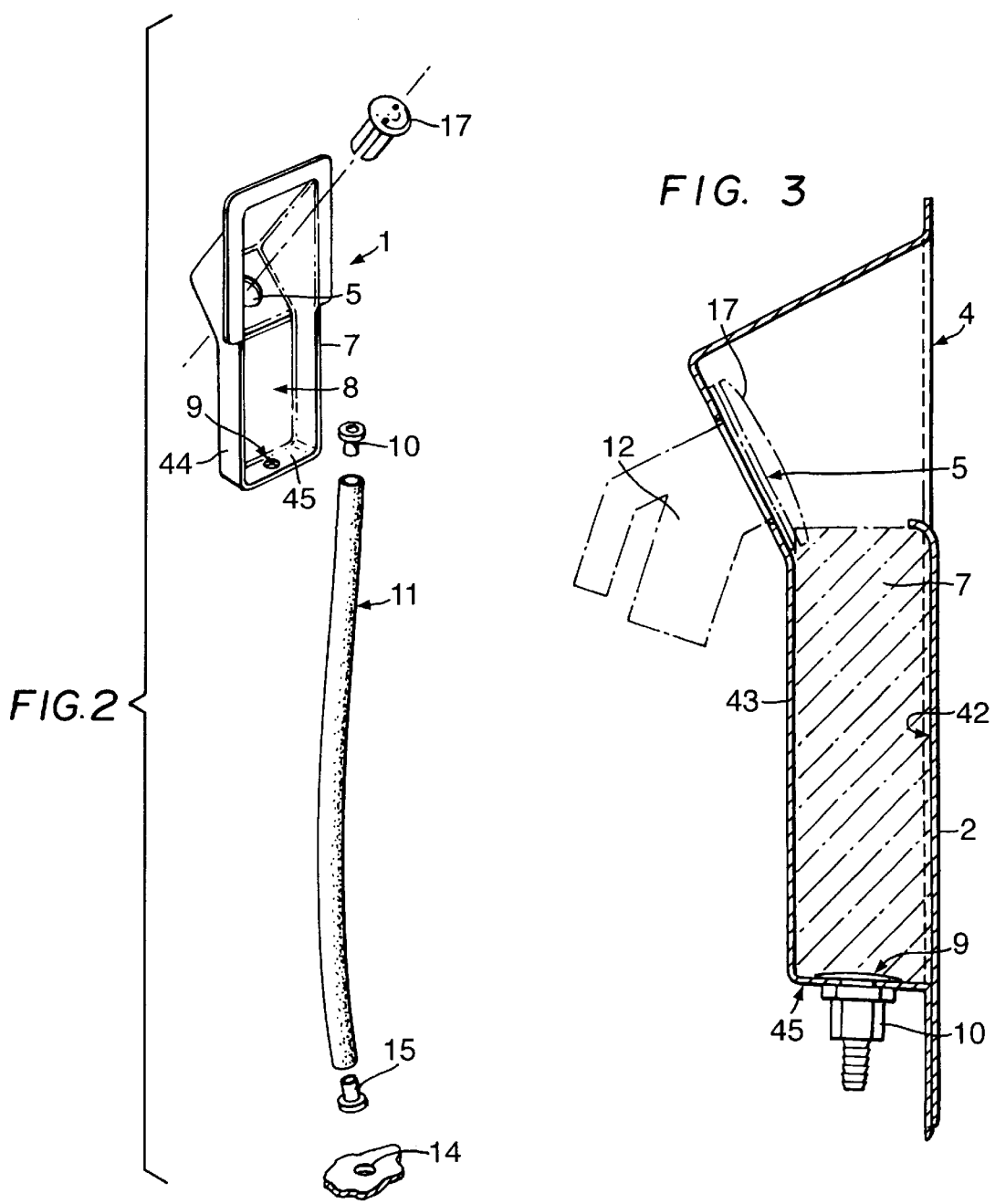

FUEL FILLING POINT

FIELD OF THE INVENTION

This invention relates to fuel filling points for engine driven marine craft and marine craft including fuel filling points. It particularly relates to fuel filling points for rigid hull inflatable marine craft.

BACKGROUND TO THE INVENTION

Internal fuel tanks are standard components of craft powered by combustion engines. A refueling point is consequently required through which the internal fuel tank can be refilled. Commonly the refueling point consists of an aperture which can be closed by a cap.

A potential problem with refueling via an external aperture occurs when the tank becomes full. Because the level of fuel in the tank cannot be visually monitored, additional fuel may be inadvertently added, which backs up and then overflows from the refueling aperture. Because the rate of such overflow will be equivalent to the rate at which fuel is being pumped, a considerable amount of overflowing fuel may accumulate very quickly.

One solution to this problem is to position sensors in the fuel pump to cut the flow when the tank is full. However it is not always appropriate to supply fuel to some types of vehicle, for example marine craft, using this type of fuel pump.

The problem of fuel overflow is particularly acute when the position of the refueling aperture is such that any overflow accumulates within a vehicle, rather than draining away outside the vehicle. This is a particular problem in boats and ships and most particularly in inflatable marine craft where there is a limited choice of positions for the refueling aperture.

The inboard accumulation of fuel represents a major safety hazard and overflow from refueling can be a significant cause of such an accumulation.

SUMMARY OF THE INVENTION

The present invention relates to a fuel filling point arrangement for marine craft (waterborne craft) that minimises the inboard accumulation of overflow fuel.

One aspect of the present invention provides a fuel filling point arrangement, wherein the fuel filling point arrangement includes a fuel filling point body having a fueling aperture defined by the body, a fueling conduit connected to the fueling aperture, an overflow pocket positioned below the fueling aperture so as to collect fuel overflow from the fueling aperture and a draining means for draining fuel out of the pocket.

In another aspect of the present invention, marine craft including a fuel filling arrangement of the present invention is provided.

In one embodiment, the draining means is arranged such that accumulated fuel is drained directly out of the marine craft, for example into the surrounding water, thus enabling safe removal of the fuel. However, the disposal of fuel into rivers and seas is known to be environmentally damaging and constitutes a direct violation of United States Federal statutes. Therefore, in an alternative preferred, and environmentally acceptable embodiment, the draining means is connected to a waste storage tank, which can be intermittently emptied in order to dispose of the waste in an environmentally acceptable way.

The fuel filling point may be used in any type of vehicle, but is particularly suitable for marine craft such as a rigid hull inflatable marine craft. All the components described below must be fuel resistant and all joints must prevent leakage.

The pocket may be formed in any convenient manner using any rigid material, conveniently metal or plastic. It is preferably formed from a single moulding, for ease of assembly. The single moulding may define the complete pocket or may define only part of the pocket with additional surfaces joined to the moulding to form the overflow pocket. The moulding may comprise the fueling aperture and a draining aperture and may be shaped to define at least one side of the overflow pocket, preferably at least two, more preferably at least three and most preferably at least three sides and a floor. The three sides may comprise a rear wall and two side walls at lateral sides of the floor. In such an embodiment, a fourth wall (front wall) may be formed from a second moulding, the first and second moulding together defining the pocket. The first and second moulding may be joined together by any convenient means, e.g. glue or resin. In preferred embodiments, the first and second mouldings together form a discrete entity which can be mounted on a casing of the craft.

Alternatively, the second moulding may be a wall of the casing on which the first moulding is mounted in use. For example, the interior of the external surface to which the single (first) moulding is attached may complete the pocket by providing a fourth wall. An opening in the external surface, for example at the top (or lip) of the fourth wall then allows access to the fueling aperture.

In embodiments in which the fully formed pocket is a discrete entity, the pocket moulding may be inserted into an external surface of the craft such that it is fixed to the exterior of the external surface but projects backwards through the surface into the interior. The opening allowing access to the fueling aperture is then formed by the pocket moulding itself.

Clearly other alternative embodiments are equally possible and would be apparent to a skilled person.

The pocket may be attached to an internal or an external surface of the vehicle by any convenient means to provide a fuel-tight seal. In preferred embodiments, glue or resin is used.

The fueling aperture may be at any convenient angle to facilitate access to it via an opening in the external surface. This can be achieved through the shape of the recess created by the moulding(s). The angle of the fueling aperture is preferably such that fuel can easily run down a fueling conduit connected to it under gravity. The aperture may be closed when refueling is not taking place by any convenient means, for example, using a closure or fuel cap. A fitting may be inserted into the aperture to facilitate the attachment of the fueling conduit and to prevent leakage. This fitting holds the conduit in place and aligns the bore of the conduit with the aperture. The size of the fueling aperture is preferably sufficient to receive standard size fuel pump nozzles.

The fueling conduit runs directly from the fueling aperture to the fuel tank. Preferably it is steeply angled so fuel in the conduit drains rapidly into the fuel tank. The fueling conduit may be of any fuel resistant material and is preferably flexible.

The overflow pocket is located below the fueling aperture so as to form a sink to which overflowing fuel from the fueling aperture drains under gravity. The pocket may be of any shape, but some preferred embodiments are substantially rectangular in cross section. It is desirable that the shape of the pocket should allow fuel accumulated in the pocket to drain through a draining aperture, which may be located at the lowest point of the pocket. Any swaying movement of the craft during travel will facilitate drainage through this aperture. The pocket may be of any suitable construction but is preferably formed by the attachment of the pocket to the interior of the external surface.

The overflow pocket may have any capacity sufficient to contain a fuel overflow. Preferably, therefore, the fuel receiving volume of the pocket is greater than 1 litre and more preferably greater than 1.66 litres. Preferred embodiments have a capacity of about 1.7 litres. There is no particular maximum volume of the pocket and this may be dictated by the size of the craft. 10 litres or less, preferably 5 litres or less and most preferably 3 litres or less is suitable for most types.

The draining means may take the form of an aperture located at the bottom of the overflow pocket such that fuel accumulated in the pocket will drain through it. In the event of overflow occurring, the pocket will fill up at about the same rate as that at which the fuel is being pumped. The rate of fuel draining through the draining aperture under gravity will be considerably less than the high rate of overflow, so fuel will rapidly accumulate in the pocket. This arrangement has the advantage over a pocket from which fuel is drained at substantially the same rate as it is added that it may facilitate earlier recognition that fuel is overflowing, enabling the operator to stop the input of fuel before too much is wasted. Although the rate of overflow is high, it is generally accidental and therefore of short duration and once the flow into the pocket has stopped, the pocket may slowly empty through the draining aperture.

Any accumulation of water in the overflow pocket will also drain out through the draining aperture, ensuring that the pocket remains substantially empty and capable of receiving overflow fuel during refueling.

Fuel passing through the draining aperture enters an overflow conduit. The overflow conduit is preferably a flexible tube. The flow through this conduit is preferably driven by gravity, but conventional pumping means may also be used. In one configuraton, the overflow conduit leads to an outflow aperture in an external surface of the craft through which the fuel can flow away outside the craft, preventing the dangerous uncontrolled accumulation of fuel inside the craft. The external surface containing the outflow aperture may be the hull of a marine craft. In this case, the drainage of fuel from the overflow pocket through the overflow conduit may be assisted by the Venturi effect when the craft is in motion and water flows past the external aperture. It is important that the joint between the aperture and the conduit is sealed to prevent water entering the hull. This sealing is preferably done using additional fittings.

Alternatively, fuel filling points of the present invention may be used to prevent overflow fuels escaping into the environment. In such embodiments, the overflow conduit feeds the overflow fuel into a storage tank.

BRIEF DESCRIPTION OF THE DRAWINGS

FIG. 2 shows an exploded diagram of the fuel filling point arrangement;

FIG. 3 shows a cross section of the fuel filling point arrangement.

DESCRIPTION OF A PREFERRED EMBODIMENT

Figure 1:
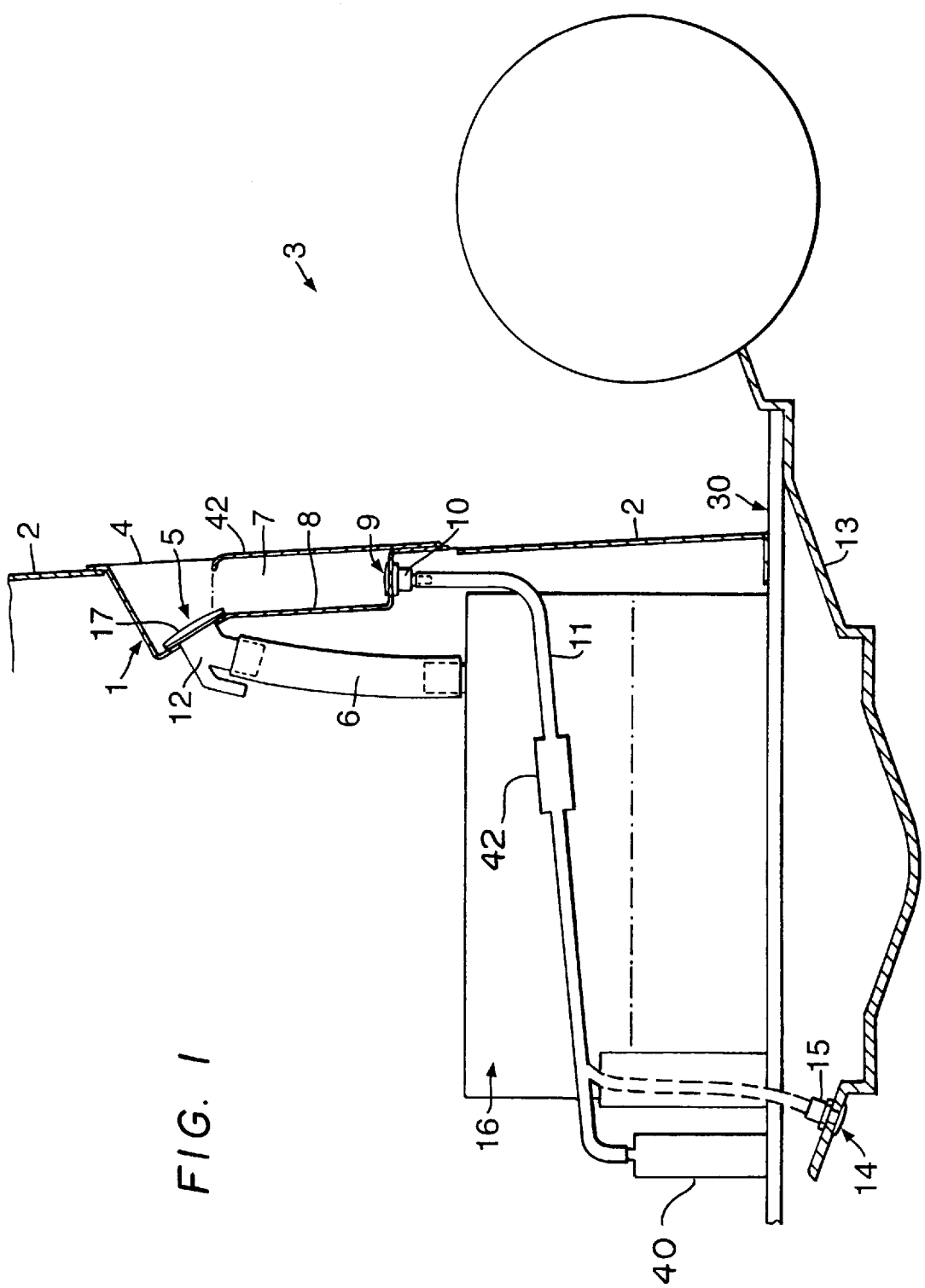
FIG. 1 shows a cross section of a rigid hull inflatable craft containing a fuel filling point embodying the invention.

A fuel filling point 1 is positioned in the wall of the console housing 2 of a rigid hull inflatable craft 3. A fueling aperture 5 in the fuel filling point 1 body allows fluid access to the fuel tank 16 via a fueling conduit 6. The fueling aperture 5 is recessed from an opening 4 in a first moulding positionable in the housing console 2. The angle of the surface containing the fueling aperture 5 is about 45° from vertical. This allows easy access by fuel pump nozzles and ensures that fuel can flow easily down the fueling conduit into the tank.

Below the fueling aperture 5 is an overflow pocket 7. The pocket 7 is positioned so as to act as a sink for fluids overflowing from the fueling aperture 5. A recess 8 containing the fueling aperture 5 and the overflow pocket 7 is constructed using the first moulding. The walls of the overflow pocket 7 are defined on three sides by the first moulding and on the fourth side by a second moulding 42, the second moulding being bonded to the side walls 44 and floor 45 of the first moulding to prevent any leakage of fuel, as further depicted in FIGS. 2 and 3.

A draining aperture 9 is positioned at the lowermost point of the overflow pocket 7. An overflow fitting 10 connects an overflow conduit 11 to the draining aperture 9. The overflow conduit passes through some trunking in the deck 30. Alternatively, a deck seal 15 secures the overflow conduit 11 as it passes through the deck 30 to the hull 13. The overflow conduit 11 may be connected to an outflow aperture 14 in the hull 3 by an overflow hull fitting 15, which prevents the ingress of water into the hull 13. Preferably, the overflow conduit 11 is connected to a suitable waste storage tank 40. A conventional pump 42 may be placed in the overflow conduit 11, all as shown in FIG. 1.

During fueling, the nozzle of a fuel pump can be inserted through opening 4 into the fueling aperture 5. Fuel is then pumped into the fuel tank 16 via the fueling conduit 6. Overflow from the fuel tank 16 backs up along the fueling conduit 6 and emerges from the fueling aperture 5. Because the fueling aperture 5 is situated in the recess 8, overflowing fuel will not pass through the opening 4 in the console housing and accumulate on the deck 30, but will instead run into the overflow pocket 7 which is located in the recess 8 beneath the fueling aperture 5. The rate of flow of fuel into the pocket will be about the same as the rate of pumping. This rate is considerably faster than the rate of drainage through the draining aperture 9 so fuel rapidly accumulates in the pocket 7. The overflow pocket 7 is therefore of sufficient volume to contain all the overflow fuel. The fuel-receiving volume of the pocket 7 is about 1.7 litres. When the fuel stops overflowing, the amount of fuel in the overflow pocket 7 will slowly decrease as fuel drains away.

The overflow fuel that has collected in the overflow pocket 7 drains out of the pocket 7 through the draining aperture 9 into the overflow conduit 11 under gravity. The fuel then flows through the overflow conduit 11, passing through the level of the deck 30, to the waste storage tank 40 where it will be held for later removal and reclamation. In localities where the overboard discharge of fuel is permitted, the fuel in the overflow conduit 11 may pass to the outflow aperture 14 in the hull 13. The fuel can then flow out of the outflow aperture 14 and thereby out of the inflatable craft 3 and into the surrounding water. The drainage of fuel from the overflow pocket through the overflow conduit 11 to the waste storage tank 40 may be assisted by pump 42 and may be assisted by the Venturi effect when the craft is in motion and water flows past the outflow aperture 14.

FIG. 3 illustrates in plan view the construction of the pocket of the fuel filling point arrangement. The pocket is defined by a rear wall 43, two side walls 44, a floor 45 and a front wall 42. The rear wall 43, side walls 44 and floor 45 are formed from the first moulding, the first moulding also defining the draining aperture 9 and the fueling aperture 5. The fourth wall 42 at the front of the pocket is formed by the second moulding bonded to the edges of the side walls 44 and floor 45 of the first moulding. The shaded area within the pocket 7 represents the fuel receiving volume of the pocket 7, which, in this embodiment, is approximately 1.7 litres.

What is claimed is:

1. A waterborne craft including a fuel filling point arrangement comprising:
   - a fuel filling point body having a front wall and a rear wall;
   - a fueling aperture defined by said rear wall of said fuel filling point body,
   - an opening defined by said front wall to enable insertion of a fuel pump nozzle into said fueling aperture during refueling;
   - a fueling conduit having a first end and a second end, said first end being connected to said fueling aperture and said second end being connected to said fuel tank of the waterborne craft;
   - an overflow pocket defined by said front wall and said rear wall of said fuel filling point body up to said fueling aperture, so as to collect fuel overflow from said fueling aperture and having a floor;
   - a draining aperture at said floor of said overflow pocket; and
   - an overflow conduit connected to said draining aperture, said overflow pocket having a fuel receiving volume of greater than 1 litre.

2. The waterborne craft according to claim 1, wherein the waterborne craft is a rigid hull inflatable waterborne craft.

3. The waterborne craft according to claim 1 further comprising a pumping means, said pumping means being connected to said overflow conduit for assisting flow through said overflow conduit.

4. The waterborne craft according to claim 1, wherein said overflow conduit is connected at a second end to a waste storage tank.

5. The waterborne craft according to claim 1, wherein said overflow pocket comprises said floor, said rear wall, two side walls, one side wall being on each lateral side of said floor, and wherein a first moulding defines said floor, said rear wall and said two side walls of said overflow pocket.

6. The waterborne craft according to claim 5 further comprising a second moulding, said first moulding and said second moulding together defining said overflow pocket.

7. The waterborne craft according to claim 6 wherein said first and second moulding form a discrete entity mounted on a console housing of the waterborne craft.

8. The waterborne craft according to claim 6 wherein said second moulding is a wall of said console housing of the waterborne craft on which said first moulding is mounted.

9. The waterborne craft according to claim 1, wherein said fuel receiving volume of said overflow pocket is greater than 1.66 litres and is less than 10 liters.

10. The waterborne craft according to claim 1, wherein said draining aperture is arranged such that, in use, a rate of flow of fuel out of said overflow pocket through said draining aperture is less than an expected rate of flow of fuel from a fuel pump into said fueling conduit.

* * * * *